US005406794A

United States Patent [19]

Litz

[11] Patent Number: 5,406,794

[45] Date of Patent: Apr. 18, 1995

[54] DUAL VARIABLE DISPLACEMENT OVER-CENTER HYDRAULIC MOTOR POWER DRIVE UNIT

[75] Inventor: Bradley C. Litz, Montville, N.J.

[73] Assignee: Curtiss Wright Flight Systems Inc., Fairfield, N.J.

[21] Appl. No.: 61,673

[22] Filed: May 14, 1993

[51] Int. Cl.[6] ............ F16D 31/02

[52] U.S. Cl. ............ 60/483; 60/484

[58] Field of Search ............ 60/419, 483, 484, 492

[56] References Cited

U.S. PATENT DOCUMENTS 3,241,319 3/1966 Andrews .

3,556,484 1/1971 Moller et al. ............ 60/419 X 3,620,130 11/1971 Roberts .

3,643,433 2/1972 Widmaier ............ 91/473 X 4,426,911 1/1984 Robinson et al. .

4,534,271 8/1985 Forster .

4,686,828 8/1987 Rosman ............ 60/484 X 4,739,618 4/1988 Kita et al. .

4,747,268 5/1988 Reinhardt ............ 60/484 X 4,813,234 3/1989 Nikolaus ............ 60/484

5,251,442 10/1993 Roche ............ 60/419 X

*Primary Examiner*—Edward K. Look

*Assistant Examiner*—John Ryznic

*Attorney, Agent, or Firm*—Klauber & Jackson

[57] ABSTRACT

The use of two variable displacement over-center hydraulic motors 12,14 in conjunction with a torque-summing gearbox 16 for maintaining the torque output of a power drive unit 10 in a typical closed loop control system is described. The torque output of the power drive unit 10 is maintained as either the sum or the difference of the torque outputs produced by the two variable displacement over-center hydraulic motors 12,14, depending upon the required system performance. This present invention use overcomes the problems associated with a single variable displacement over-center hydraulic motor operating in the stick-slip zone.

5 Claims, 2 Drawing Sheets

DUAL VARIABLE DISPLACEMENT OVER-CENTER HYDRAULIC MOTOR POWER DRIVE UNIT

BACKGROUND OF THE INVENTION

1. Field of the Invention

The present invention relates to variable displacement over-center hydraulic motors (VDOCM's) and, more particularly, to the use of two or more VDOCM's in conjunction with a torque-summing gearbox so as to overcome swashplate stick-slip zone problems experienced by single VDOCM's operating under light load or no load conditions.

2. Description of the Prior Art

The use of VDOCM's in closed loop position, speed, or hydraulic power control systems is well known in the art. For example, U.S. Pat. No. 4,534,271 discloses a means for combining plural VDOCM devices in an aggregate, U.S Pat. No. 4,426,911 discloses an actuator device using dual VDOCM devices coupled together by drive gears, and U.S. Pat. No. 3,241,319 discloses the use of dual VDOCM devices in a hydraulic apparatus. Furthermore, the use of one or more VDOCM's in hydrostatic transmissions is common, as illustrated in U.S. Pat. Nos. 4,739,618, 3,643,433, and 3,620,130.

Although all of the above-mentioned prior art patents disclose certain applications where it is beneficial to use one or more VDOCM devices, none address the situation where a single VDOCM device experiences swashplate stick-slip problems. Such a situation occurs when the resident swashplate is positioned at a small angle (which results in a small displacement), which results in the VDOCM having a frictional torque loss that exceeds its torque output capability. Thus, in this situation it is extremely difficult for the VDOCM device to maintain adequate position and speed controlled responses under light load or no load conditions.

It is therefore desirable to overcome the shortcomings of the above-mentioned prior art patents in this area, while still incorporating the positive benefits associated with VDOCM device use.

SUMMARY OF THE INVENTION

The present invention contemplates the use of two or more VDOCM's in conjunction with a torque-summing gearbox so as to overcome swashplate stick-slip zone problems experienced by single VDOCM's operating under light load or no load conditions. The present invention may be realized in many forms, but is most easily realized when two VDOCM's are used in conjunction with a torque-summing gearbox so as to provide a power drive unit (PDU) with a suitable torque output. In such a case, the torque output of the PDU may be comprised of either the sum of the individual VDOCM generated torques or the difference between the individual VDOCM generated torques, depending on the required system performance.

Generally, the method of operation of the present invention in the form described above is as follows. The torque output of the PDU under heavy load conditions is provided by summing the torques of the individual VDOCM devices. This is accomplished by positioning the swashplate of each VDOCM in the necessary orientation such that the respective generated torques are in a common direction and are therefore added at the torque-summing gearbox. Under light load or no load conditions, however, the torque output of the PDU is the difference between the torques provided by the individual VDOCM devices. This is accomplished by positioning the swashplates of each VDOCM in the necessary orientation such that the direction of the respective generated torques are opposite to each other and therefore subtract from one another at the torque-summing gearbox. Thus, when a small PDU torque output is desired, it is generated as the difference of two larger VDOCM torques.

Normally under light load or no load conditions, the swashplate of a single VDOCM would be positioned at a low cam angle, or in the stick-slip zone. In the case of the above-described present invention, however, the swashplates of both VDOCM devices are positioned safely outside of their respective stick-slip zones under similar light load or no load conditions. Thus, the present invention allows a PDU to maintain adequate position and speed controlled responses under light load or no load conditions.

From the above descriptive summary it is thus apparent how the present invention overcomes the shortcomings of the above-mentioned prior art patents.

Accordingly, the primary objective of the present invention is to combine the use of two or more VDOCM's in conjunction with a torque-summing gearbox so as to overcome swashplate stick-slip zone problems experienced by single VDOCM's operating under light load or no load conditions.

Other objectives and advantages of the present invention will become apparent to those skilled in the art upon reading the following detailed description and claims, in conjunction with the accompanying drawings which are appended hereto.

BRIEF DESCRIPTION OF THE DRAWINGS

In order to facilitate a fuller understanding of the present invention, reference is now be made to the appended drawings. These drawings should not be construed as limiting the present invention, but are intended to be exemplary only.

PREFERRED EMBODIMENT OF THE PRESENT INVENTION

Figure 1:
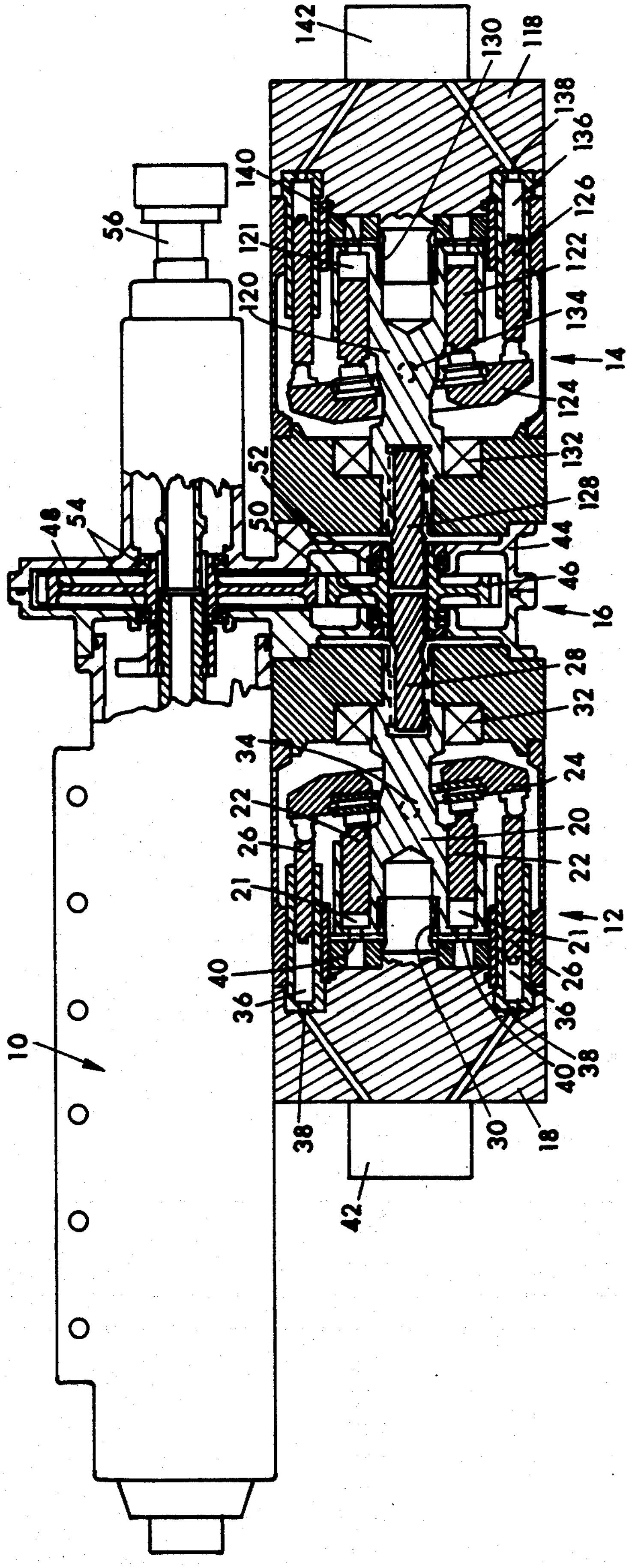
FIG. 1 shows a dual variable displacement over-center hydraulic motor power drive unit according to the present invention, with its swashplates in a heavy external load position.

Referring to FIG. 1, there is shown a power drive unit (PDU) 10 engaged with a first variable displacement over-center hydraulic motor (VDOCM) 12 and a second VDOCM 14 by way of a torque-summing gearbox 16, according to the present invention. The first VDOCM 12 is comprised of a multisectional housing 18 containing a cylinder barrel 20, a pair of working pistons 22, a swashplate 24, a pair of control pistons 26, and an output shaft 28. The cylinder barrel 20, in which a pair of cylinders 21 are provided for accommodating the pair of working pistons 22, is connected to the output shaft 28 in a mating spline manner, and is supported in the housing 18 by a first roller bearing 30 and a second roller bearing 32 such that the cylinder barrel 20, the pair of working pistons 22, and the output shaft 28 are all rotatable around and within the first roller bearing 30 and the second roller bearing 32, respectively. The swashplate 24 is non-rotatable but tiltable about a pivot 34 whose axis intersects the axis of rotation of the cylinder barrel 20, the pair of working pistons 22, and the output shaft 28.

The housing 18 provides a pair of cylinders 36 for accommodating the pair of control pistons 26, a first pair of pressure ports 38 to the control piston cylinders 36, and a second pair of pressure ports 40 to the working piston cylinders 21. The first pair of pressure ports 38 are connected to a servovalve 42, while the second pair of pressure ports 40 are connected to a hydraulic pressure supply (not shown) that is common between the first 12 and second 14 VDOCM's.

The second VDOCM 14 is constructed and operates in a manner identical to the first VDOCM 12, wherein multisectional housing 118 corresponds to multisectional housing 18, cylinder barrel 120 corresponds to cylinder barrel 20, working pistons 122 correspond to working pistons 22, swashplate 124 corresponds to swashplate 24, control pistons 126 correspond to control pistons 26, and output shaft 128 corresponds to output shaft 28. Furthermore, working piston cylinders 121 correspond to working piston cylinders 21, first roller bearing 130 corresponds to first roller bearing 30, second roller bearing 132 corresponds to second roller bearing 32, pivot 134 corresponds to pivot 34, control piston cylinders 136 correspond to control piston cylinders 36, first pressure ports 138 correspond to first pressure ports 38, second pressure ports 140 correspond to second pressure ports 40, and servovalve 142 corresponds to servovalve 42.

The general method of displacement operation for both the first VDOCM 12 and the second VDOCM 14 is as follows. The swashplate 24 of the first VDOCM 12 is positioned by the control pistons 26 which are controlled by the servovalve 42. The swashplate 124 of the second VDOCM 14 is positioned by the control pistons 126 which are controlled by the servovalve 142. Both servovalves 42,142 are, in turn, controlled by external control logic (not shown) of a type typically used in closed loop control systems. The angle of each swashplate 24,124 determines the respective displacement of each VDOCM 12,14. Upon application of a differential hydraulic pressure to the second pressure ports 40,140 of each VDOCM 12,14 by the common hydraulic pressure supply, an output torque is developed by each VDOCM 12,14 from the action of the working pistons 22,122 against the swashplate 24,124 and the cylinder barrel 20,120, respectively. The direction of torque output from each VDOCM 12,14 is dependent on the angle of the swashplate 24,124 in relation to the plane perpendicular to the axis of rotation of the cylinder barrel 20,120, respectively. The respective torques are then transferred to the output shafts 28,128 of each VDOCM 12,14 and into the torque-summing gearbox 16. It should be noted that both the first VDOCM 12 and the second VDOCM 14 are of a type that is well known, and thus this particular type of VDOCM is not an object of the present invention.

The torque-summing gearbox 16 is comprised of a multisectional housing 44 containing a first gear 46 and a second gear 48 that engage at point 50. The first gear 46 is supported in the housing 44 by a first pair of roller bearings 52, while the second gear 48 is supported in the housing 44 by a second pair of roller bearings 54. The first gear 46 provides a splined hub that accepts the splined output shafts 28,128 from both the first 12 and the second 14 VDOCM's, respectively. The second gear 48 provides a splined hub that accepts a pair of splined output shafts 56,58 from the PDU 10. It is these PDU output shafts 56,58, or rather the amounts of external load that is applied thereto, that determines the amount of torque output required by the first 12 and the second 14 VDOCM's.

With all of the components of the present invention now fully described, the general method of operation of the present invention is as follows. When either of the PDU output shafts 56,58 are under a heavy external load, the positioning of the swashplates 24,124 is such that the torque output by both VDOCM 12,14 is in the same direction. Thus, these output torques add at the torque-summing gearbox 16 and their sum is output on the PDU output shafts 56,58. A typical swashplate 24,124 positioning for such a heavy external load condition is as shown in FIG. 1.

Figure 2:
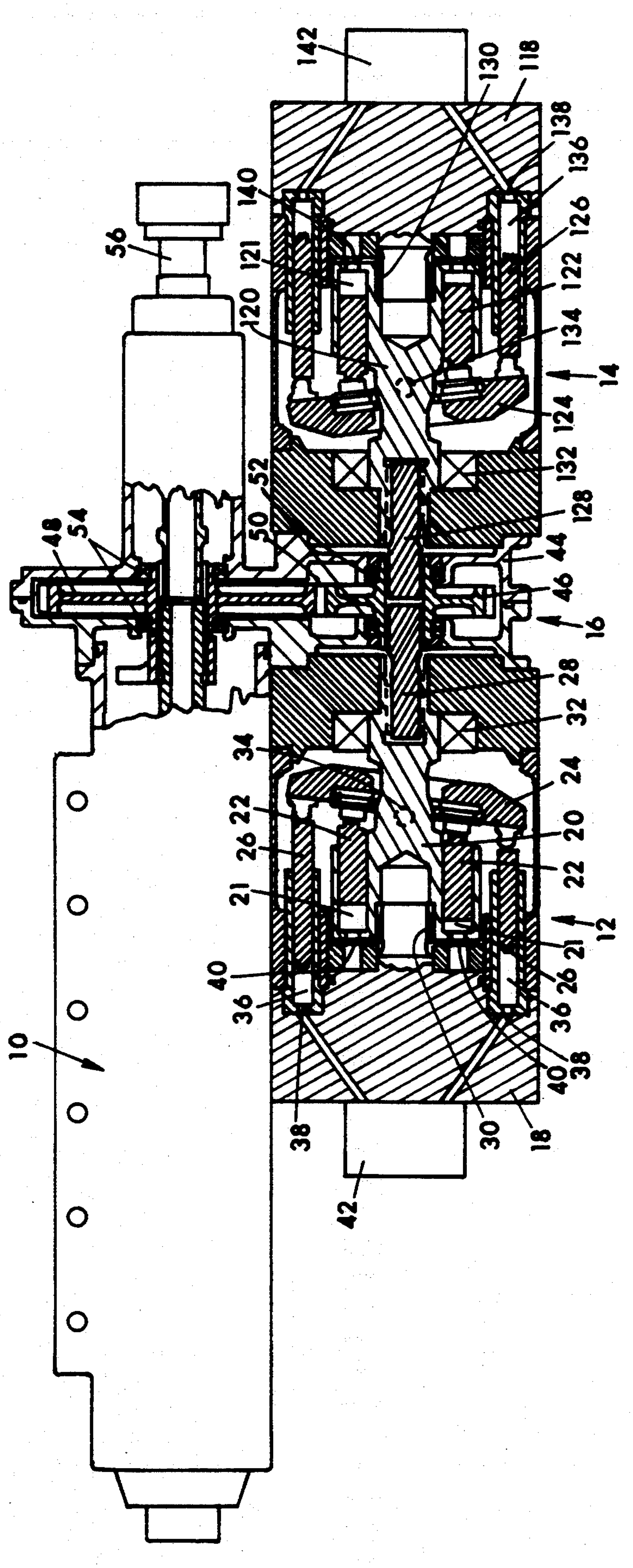
FIG. 2 shows a dual variable displacement over-center hydraulic motor power drive unit according to the present invention, with its swashplates in a light or no external load position.

Under relatively light or no external loads, however, the swashplates 24,124 are positioned such that the output torques from the two VDOCM's 12,14 oppose each other. In other words, one VDOCM will generate a positive torque while the other VDOCM will generate a negative torque, and the difference of the two will be output on the PDU output shafts 56,58. A typical swashplate 24,124 positioning for such a light or no external load condition is as shown in FIG. 2. The advantage of this type of light or no external load swashplate 24,124 positioning is that neither swashplate 24,124 is required to operate at a low cam angle, or in the stick-slip zone.

In addition to overcoming stick-slip zone problems, the present invention avoids the large flow consumption associated with comparable fixed displacement motors since here the two VDOCM's 12,14 are connected to the same hydraulic pressure supply and therefore one VDOCM consumes flow while the other VDOCM restores flow to the supply when operating under light-load or no-load conditions.

With the present invention now fully described it can thus be seen that the primary objective set forth above is efficiently attained and, since certain changes may be made in the above described components without departing from the scope of the invention, it is intended that all matter contained in the above description or shown in the accompanying drawings shall be interpreted as illustrative and not in a limiting sense.

What is claimed is:

1. An apparatus for maintaining a torque output in a closed loop control system as either the sum or the difference of a plurality of torque outputs produced by a corresponding plurality of variable displacement hydraulic motors, said apparatus comprising:

a plurality of variable displacement hydraulic motors, wherein each of said plurality of variable displacement hydraulic motors produces a torque output;

means for summing or differencing the torque outputs produced by each of said plurality of variable displacement hydraulic motors, wherein a composite output torque is produced; and means for applying said composite output torque to an external load, such that regardless of the magnitude of said external load none of said plurality of variable displacement hydraulic motors need operate in a stick-slip zone.

2. The apparatus as defined in claim 1, wherein said plurality of variable displacement hydraulic motors comprises two variable displacement hydraulic motors which are connected to a common hydraulic supply, wherein one variable displacement hydraulic motor consumes fluid flow from said common hydraulic supply while the other variable displacement hydraulic motor restores fluid flow to said common hydraulic supply when under light-load or no-load conditions.

3. The apparatus as defined in claim 2, wherein said two variable displacement hydraulic motors are variable displacement over-center hydraulic motors.

4. The apparatus as defined in claim 1, wherein said means for summing or differencing is a torque summing gearbox.

5. The apparatus as defined in claim 1, wherein said means for applying said composite output torque to an external load is a power drive unit.

* * * * *